(12) United States Patent
Welter

(10) Patent No.: US 8,990,599 B2
(45) Date of Patent: Mar. 24, 2015

(54) POWER CONTROL OPTIMIZATION IN A COMMUNICATION NETWORK

(75) Inventor: Karl-Heinz Welter, Herzogenrath (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1233 days.

(21) Appl. No.: 12/747,898

(22) PCT Filed: Dec. 14, 2007

(86) PCT No.: PCT/EP2007/011028
§ 371 (c)(1),
(2), (4) Date: Oct. 5, 2010

(87) PCT Pub. No.: WO2009/076979
PCT Pub. Date: Jun. 25, 2009

(65) Prior Publication Data
US 2011/0154070 A1    Jun. 23, 2011

(51) Int. Cl.
*G06F 1/26* (2006.01)
*H04W 52/28* (2009.01)
*H04W 52/38* (2009.01)

(52) U.S. Cl.
CPC ............ *H04W 52/28* (2013.01); *H04W 52/386* (2013.01)
USPC .......................................... 713/320; 709/226

(58) Field of Classification Search
CPC ..................... G06F 1/3206; H04W 52/0203
USPC .......................................... 713/320; 709/226
See application file for complete search history.

(56) References Cited

U.S. PATENT DOCUMENTS

| | | | | |
|---|---|---|---|---|
| 7,337,334 B2 * | 2/2008 | Kuhlmann et al. | ............ | 713/300 |
| 7,581,125 B2 * | 8/2009 | Ranganathan et al. | ....... | 713/320 |
| 7,831,843 B2 * | 11/2010 | Brundridge et al. | .......... | 713/300 |
| 8,250,382 B2 * | 8/2012 | Maglione et al. | ............ | 713/300 |
| 2006/0079297 A1 | 4/2006 | Pilgram et al. | | |
| 2007/0066329 A1 | 3/2007 | Laroia et al. | | |

FOREIGN PATENT DOCUMENTS

| | | |
|---|---|---|
| GB | 2396523 A | 6/2004 |
| WO | 0207464 A1 | 1/2012 |

OTHER PUBLICATIONS

Daub, Microsoft could save 45 million tons of $CO_2$ emissions with a few lines of computer code, Blog, Nov. 15, 2006, pp. 1-4, Carnegie Endowment for International Peace, Washington, DC.
Sinha et al., JouleTrack—A Web Based Tool for Software Energy Profiling, Jun. 18-22, 2001, 6 Pages, Proceedings of Design Automation Conference, 2001, ACM, Las Vegas, NV.

* cited by examiner

*Primary Examiner* — Albert Wang
(74) *Attorney, Agent, or Firm* — Coats & Bennett, PLLC

(57) ABSTRACT

The present invention relates to power control optimization in a communication network aiming at increased flexibility for controlling the power consumption in a network node (10). The network node (10) forwards operational state information to a power control module (18). The power control module (18) generates a power control recommendation as a proposal for the power control configuration of the network node (10) to optimize power consumption thereof. The power control recommendation is then forwarded to the network node (10) for subsequent optimization of the controlling of power consumption in the network node (10).

18 Claims, 6 Drawing Sheets

POWER CONTROL OPTIMIZATION IN A COMMUNICATION NETWORK

FIELD OF INVENTION

The present invention relates to power control optimization in a communication network, in particular to a method of operating a power control module for optimizing power consumption of a network node operated in a communication system, to a method of controlling power consumption of the network node, and a related power control module and network node.

BACKGROUND OF INVENTION

In WO 02/07464 A1 there is described an adaptive power management for a network node operated in a cellular communication network. Equipment and/or functions at the network node of the cellular communication network are turned off or put into sleep mode during periods of low traffic in order to reduce power consumption of the network node. The equipment and/or functions are then turned back on again during periods of high traffic load in order to provide the required functionality to the user.

In view of real time services and applications provided by the network node and in view of dynamic traffic load characteristics, the power control needs to fulfill real time and dynamic requirements.

SUMMARY OF INVENTION

In view of the above, the technical problem of the present invention is to increase flexibility for controlling the power consumption in the network node.

According to a first aspect of the present invention this technical object is achieved by a method of operating a power control module for optimizing power consumption of a network node operated in a communication system. In a first step there is received operational state information from the network node at the power control module. In a second step there is generated a power control recommendation at the power control module through evaluation of operational state information of the network node as a proposal for the power control configuration of the network node to optimize power consumption thereof. The power control recommendation is then forwarded in a third step from the power control module to the network node.

An important advantage of the present invention is that controlling of power consumption is not based on power control commands to be strictly followed at the network node but on power control recommendations. Here, a power control recommendation will be used for optimization of power consumption at the network node if the operative state of the network node at the time of receiving the power control recommendation is in line with the operative state information forwarded to the power control module. Otherwise, power control at the network node is not restricted to the power control recommendation if during generation of the power control recommendation the operative state of the network node has changed significantly.

Preferably, according to the present invention the operational state information is related to the state of at least one service provided by the network node, to the state of at least one software module executed in the network node, and/or to the state of at least one hardware unit of the network node.

Therefore, according to the present invention there is achieved utmost flexibility in optimizing power consumption within the network node. The reason for this is that operative state of the network node is interpreted in its broadest sense and not only restricted, e.g., the turn on or off of hardware components of the network node. To the contrary, also the operative state of functional components on a higher operative level in the network node is considered, e.g., the operative state of software modules on the runtime environment or application level or the operative state of services like real time voice services, real time data links, etc.

Preferably, according to the present invention the power control recommendation is a full power control recommendation covering a full set of parameters being related to the controlling of the power consumption of the network node, or is a partial power control recommendation covering a subset of parameters being related to the controlling of the power consumption of the network node.

The differentiation between the full power control recommendation and the partial power recommendation allows to further increase flexibility for optimized controlling of power consumption of the network node. Here, the full power control recommendation supports maximum impact on the power control of the network node. On the other hand, the use of a partial power control recommendation reduces the computational complexity for generation of the power control recommendation at the power control module. Further, the partial power control recommendation suits a constellation where it is known per se that only specific sub-components on any operative level of the network node are either per se or according to a current operative state of the network node open to power consumption optimization.

Further preferred embodiments are related to the processing of received operational state information at the power control module.

As a first option heretofore, according to the present invention it is suggested to develop an operational state diagram reflecting operational states of the network node and transitions between the operational states. Then, the received operational state information is used for prediction of a future operational state on the basis of the operational state diagram for generation of the power control recommendation.

A further option for the processing of received operational state information at the power control module is to map received operational state information into reference load profile data. Typically, the reference load profile data reflects typical load constellations of the network node, e.g., over time or with respect to typical operative requirements. Then, received operational state information of the network node may be used for prediction of a future operational load on the basis of the reference load profile and for generation of the power control recommendation.

Irrespective of what option is used for processing of operational state information received at the power control module, both options offer the possibility for repeated update and adaptation to changing operative conditions in the communication system. Also, both options are flexible enough to accommodate any type of state information, e.g., with respect to services, software, and/or hardware.

Further, according to a second aspect of the present invention the technical object outlined above is also achieved by a method of controlling power consumption of a network node operated in a communication system. A first step serves to determine operational state information according to the operational state of the network node. In a second step the operational state information is forwarded from the network node to a power control module for generation of a power control recommendation. Then, in a third step the power control recommendation is received at the network node from the power control module as a proposal for the power control configuration of the network node to optimize power consumption thereof. In a fourth step, power control is executed for the network node in consideration of the power control recommendation.

Similar advantages as outlined above for the method of operating a power control module also prevail for the method of controlling power consumption of the network node.

Further, the non-binding character of the power control recommendation for optimization of power consumption at the network node allows to cope with constellations where the operational state information underlying the generation of the power control recommendation no longer matches the operative state of the network node at a later time when the power control recommendation is received at the network node.

According to a preferred embodiment of the second aspect of the present invention, there is executed a step of interrogating operational states with a pre-determined timing and with respect to at least one service provided by the network node, at least one software executed in the network node, and/or at least one hardware unit of the network node for determination of the operational state information.

The interrogation of operative states according to a pre-determined timing is of particular advantage when the operative states of the network node vary over time. Here, the incorporation of timing into operative state interrogation improves accuracy of controlling power consumption of the network node.

According to a further preferred embodiment of the second aspect of the present invention the power control recommendation is a full power control recommendation covering a full set of parameters being related to the controlling of the power consumption of the network node or a partial power control recommendation covering a subset of parameters being related to the controlling of the power consumption of the network node. This leads to similar advantages as outlined above with respect to the method of operating the power control node.

According to a further preferred embodiment of the second aspect of the present invention it is suggested to determine applicability of the power control recommendation at the network node. E.g., the determination of applicability may be achieved through consideration of a set of pre-determined power control rules and/or a set of pre-determined power control constrains for the network node.

Besides increase of flexibility for controlling the power consumption at the network node, an important advantage of considering the applicability of the power control recommendation is that power consumption optimization cannot lead to malfunction in the network node, e.g., due to a turn off of a functional unit aiming at reduced power consumption according to a power control commendation being overturned by a later load constellation where the functional unit actually needs to stay in operation.

Preferably, the power control recommendation is implemented upon applicability thereof. Alternatively, there is forwarded a non-applicability indication to the power control module upon non-applicability of the power control recommendation.

Here, the indication of non-applicability of the power control recommendation from the network node to the power control module is of particular advantage in case, e.g., power consumption optimization becomes obsolete in sub-systems of the network node, e.g., due to maintenance or renewal of the sub-systems. In other words, upon non-applicability of power control recommendations any waste of processing resources is avoided at the power control module.

According to another aspect of the present invention there is provided a computer program product directly loadable into the internal memory of a power control module and/or a network node comprising software code portions for performing the inventive power control recommendation and implementation process when the product is run on a processor of the power control module and/or network node.

Therefore, the present invention is also provided to achieve an implementation of the inventive method steps on computer or processor systems. In conclusion, such implementation leads to the provision of computer program products for use with a computer system or more specifically a processor comprised in e.g., a power control module and/or a network node.

This programs defining the functions of the present invention can be delivered to a computer/processor in many forms, including, but not limited to information permanently stored on non-writable storage media, e.g., read only memory devices such as ROM or CD ROM discs readable by processors or computer I/O attachments; information stored on writable storage media, i.e. floppy discs and hard-drives; or information convey to a computer/processor through communication media such as network and/or telephone networks via modems or other interface devices. It should be understood that such media, when carrying processor readable instructions implementing the inventive concept represent alternate embodiments of the present invention.

Overall, the implementation of the power control for controlling the power consumption in network nodes as outlined above will help to significantly reduce the power consumption of the entire communication network as well as individual sub-systems of the communication network which implement the power control according to the present invention. A reduction of energy consumption within the communication system will have a beneficial impact on $CO_2$ consumption, usage of natural, non-replenishing resource, and finally on operator costs for operating the communication system.

Also, by decreasing the overall up time of sub-systems in the communication system it is possible to achieve an increased overall absolute lifetime of components in the sub-systems of the communication system due to a stretch out of related operative times.

BRIEF DESCRIPTION OF DRAWING

In the following the best mode of carrying out the present invention as preferred embodiments thereof will be described with reference to the drawing, wherein.

DESCRIPTION OF BEST MODE AND PREFERRED EMBODIMENTS

Figure 1:
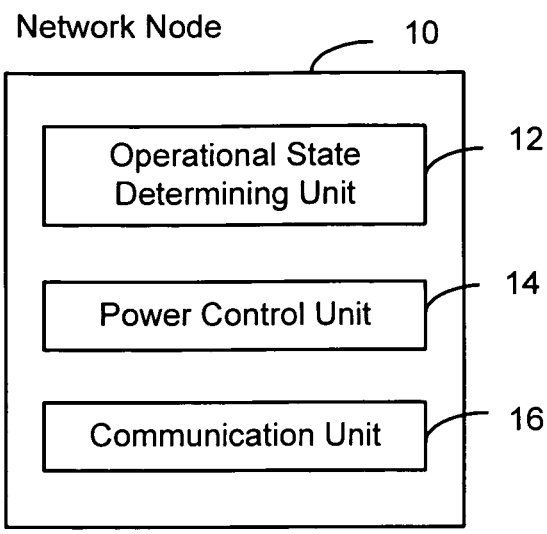
FIG. 1 shows a schematic diagram of a network node according to the present invention.

In the following, the best mode of carrying out the invention as well as preferred embodiments thereof will be described through reference to the drawing. Here, insofar as different functionalities of the present invention are described, it should be clear that such functionality may be achieved either in hardware, in software, or through a combination thereof.

Existing telecommunication systems are running 24 hours a day, 365 days a year. The consumed energy per year calculates to:

$$365 \text{ days} * 24 \text{ hours} * \text{Power Consumption}_{kW} = \text{Energy per Year}_{kWh}.$$

Existing hardware solutions, supported by the software running on these hardware systems, are consuming a similar amount of power almost independent of the current load situation of the system. I.e., consumption during low traffic hours is almost the same as during peak traffic hours.

In view of the above, the basic idea underlying the present invention is to provide options to reduce the overall power consumption by putting well defined Service/Software/Hardware components fully or partially into a no-, or very-low-power mode during predicted time frames dynamically learned by the power control system and/or through means of parameter definition.

In more detail, the present invention relates to a power control system which allows for a controlled dynamic power reduction of the complete system and/or sub-systems by controlling the power consumption of individual components on a functional service, software level and/or a hardware level with respect, e.g., to blade cluster implementing hardware in a modular way and hardware built in a hierarchical manner using cabinets, magazines, circuit boards, and functional entities, e.g., DSP blocks.

In the following, the present invention will be described in more detail through reference to the drawings.

FIG. 1 shows a schematic diagram of a network node 10 according to the present invention.

As shown in FIG. 1, the network node 10 comprises an operation state determining unit 12, a power control unit 14, and a communication unit 16.

Figure 2:
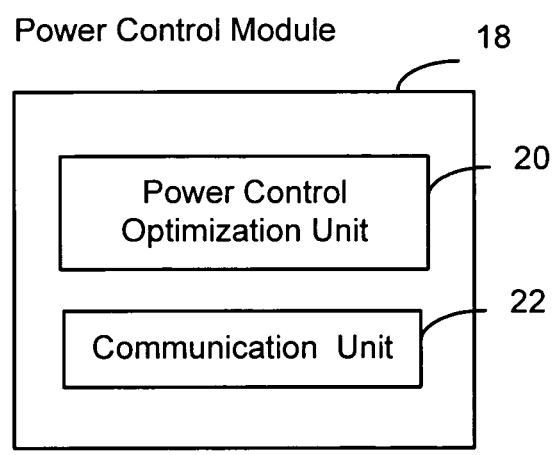
FIG. 2 shows a schematic diagram of a power control module according to the present invention.

FIG. 2 shows a schematic diagram of a power control module 18 according to the present invention.

As shown in FIG. 2, the power control module 18 comprises a power control optimization unit 20 and a communication unit 22.

It should be mentioned, that according to the present invention the network node 10 may be any functional unit in a communication system, e.g., a base station in a wireless communication system or a base station controller. Also the power control module 18 may be implemented as a separate power control module or integrated into the communication network infrastructure, e.g., into a base station controller, a radio network controller, or a mobile switching centre of a wireless communication network.

Figure 3:
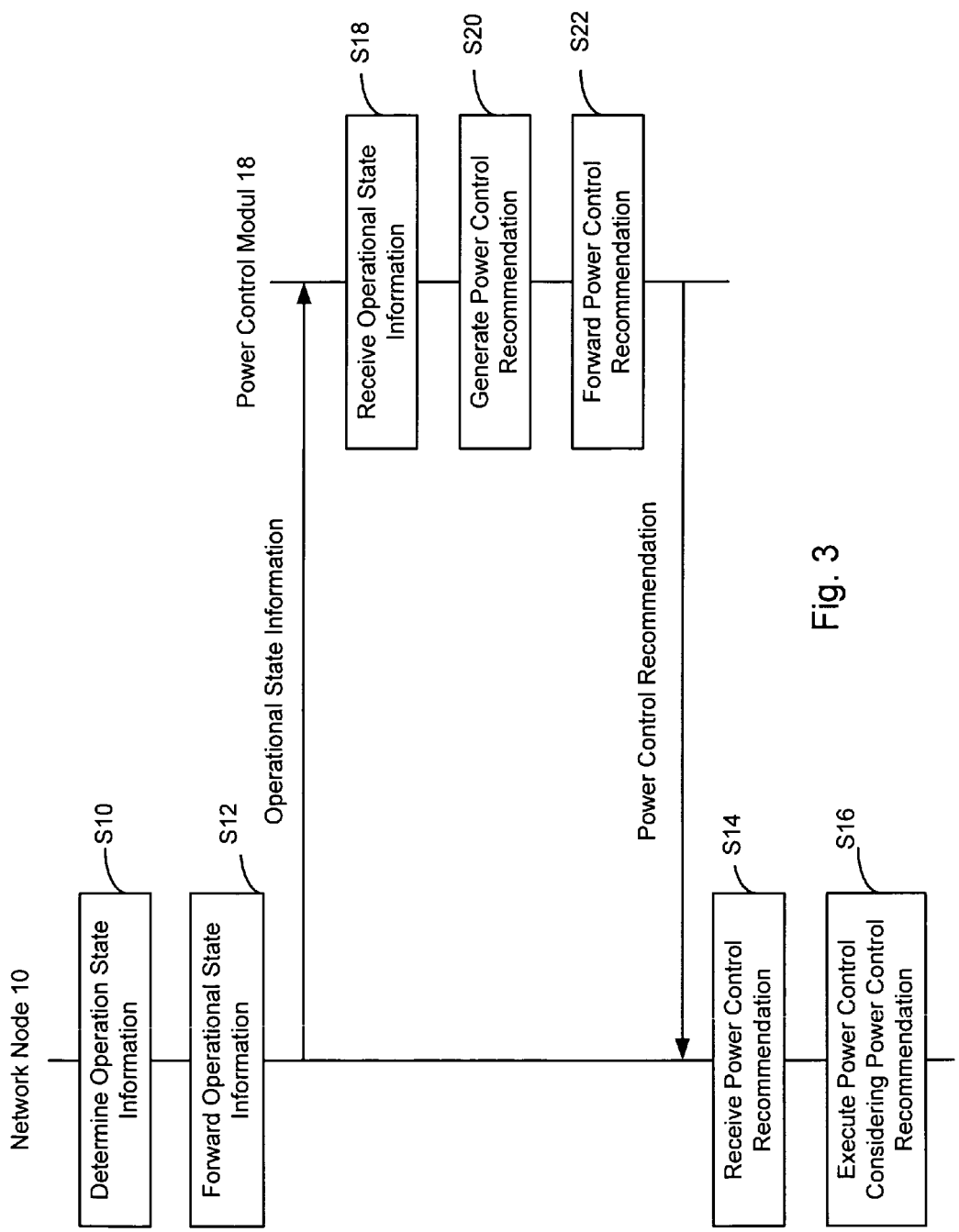
FIG. 3 shows a flowchart of operation for the network node shown in FIG. 1 and a flowchart of operation of the power control module shown in FIG. 2.

FIG. 3 shows a flowchart of operation for the network node 10 shown in FIG. 1 and a flowchart of operation of the power control module 18 shown in FIG. 2.

As shown in FIG. 3, the network node 10 operatively executes a method of controlling and optimizing power consumption in the network node.

As shown in FIG. 3, a step S10, operatively executed by the operational state determining unit 12, serves to determine operational state information according to the operational state of the network node 10. Here, it should be mentioned that according to the present invention an operational state may be related to any service, software, and/or hardware operation executed in the network node 10.

Typical examples for the determination of operational states are, e.g., an evaluation of ongoing services and corresponding resources used by the ongoing services. On the software level typical examples are consideration of executed programs, active processes, active software tasks, working memory occupation, interrogation of software status registers, etc. On the hardware level, typical examples are evaluation of working memory occupation rate, clocking frequencies of processors, etc. It should be noted that the examples given above are illustrative only and of non-restricting nature regarding the scope of the present invention.

As shown in FIG. 3, a step S12, operatively executed by the communication unit 16, serves to forward the operational state information from the network node 10 to the power control module 18 for generation of a power control recommendation. According to the present invention, this step may be executed continuously, periodically, on request from either a user of the network node or from the power control module 18, and/or according to a service, software, and/or hardware change event in the network node 10.

As shown in FIG. 3, a step S14, operatively executed by the communication unit 16, serves to receive the power control recommendation from the power control module 18 as a proposal for the power control configuration of the network node 10 to optimize power consumption thereof. Here, the power control recommendation is a full power control recommendation covering a full set of parameters being related to the controlling of the power consumption of the network node 10 or a partial power control recommendation covering a subset of parameters being related to the controlling of the power consumption of the network node 10.

Further, the power control recommendation can be an absolute power control recommendation. In this case the recommendation indicates one or more absolute values, e.g., parameter values for the power configuration. The power control recommendation can be a differential power control recommendation. In this case the recommendation indicates a recommended change or a difference from a current value, e.g., in terms of a percentage or of an absolute value. The power control recommendation can be a direction power control recommendation. In this case the recommendation whether to increase, to keep unchanged, or to decrease one or more parameters relevant for the power consumption. Any combination of the mentioned types of power control recommendations is possible.

As shown in FIG. 3, a step S16, operatively executed by the power control unit 14, serves to execute the power control for the network node 10 in consideration of the power control recommendation.

As shown in FIG. 3, the power control module 18 operatively executes a method for optimizing power consumption of a network node 10.

As shown in FIG. 3, a step S18, operatively executed by the communication unit 22, serves to receive operational state information from the network node 10.

As shown in FIG. 3, a step S20, operatively executed by the power control optimizer unit 20, serves to generate the power control recommendation through evaluation of operational state information of the network node 10 as a proposal for the power control configuration of the network node 10 to optimize power consumption thereof.

As shown in FIG. 3, a step S22, operatively executed by the communication unit 22, serves to forward the power control recommendation to the network node 10.

Figure 4:
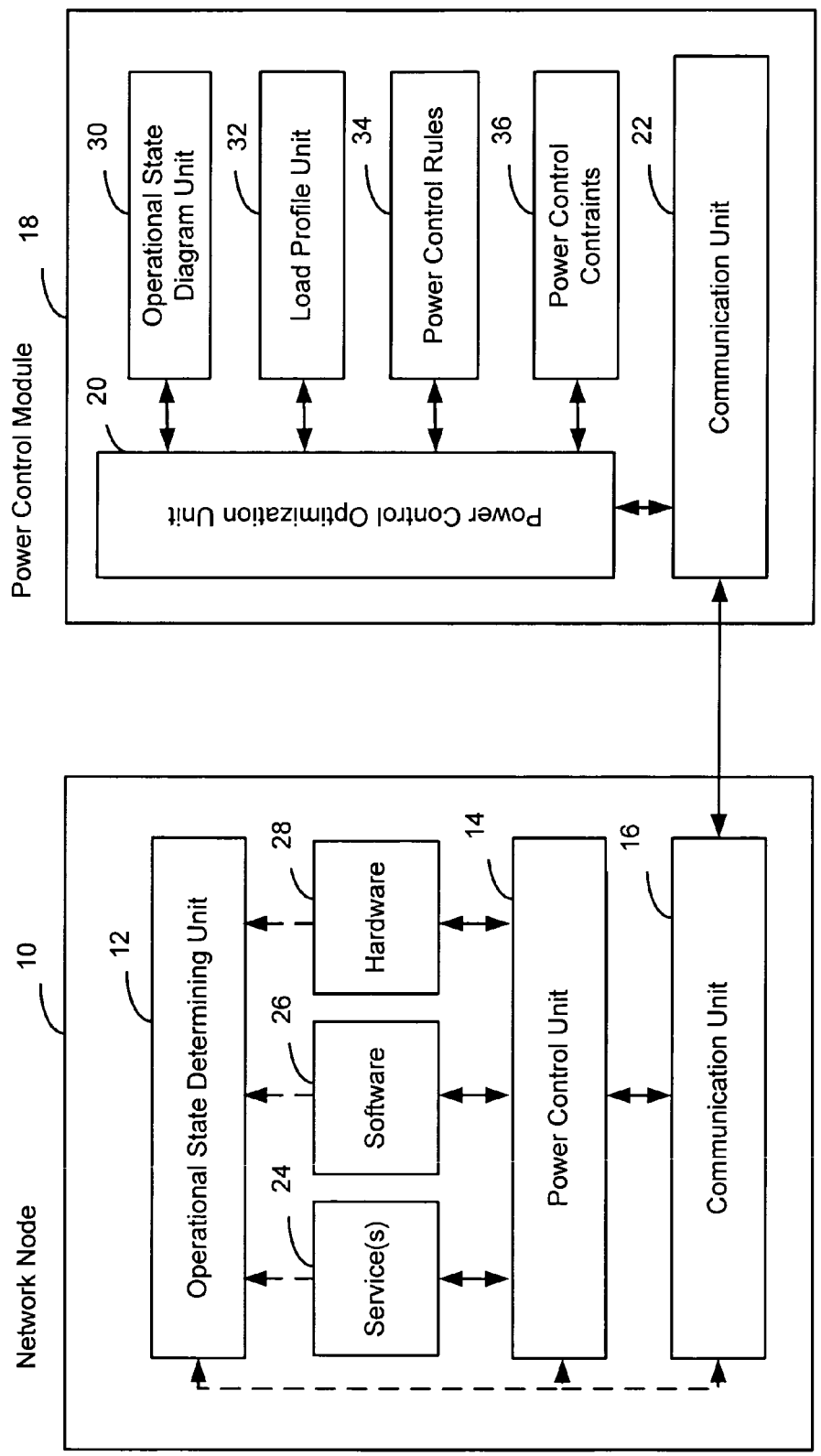
FIG. 4 shows a further detailed schematic diagram of the network node shown in FIG. 1 and a further detailed schematic diagram of the power control module shown in FIG. 2.

FIG. 4 shows a further detailed schematic diagram of the network node 10 shown in FIG. 1 and a further detailed schematic diagram of the power control module 18 shown in FIG. 2.

As shown in FIG. 4, the network node 10 shown in FIG. 1 further comprises a service unit 24, a software unit 26, and a hardware unit 28.

As shown in FIG. 4, the power control unit 18 shown in FIG. 2 further comprises an operational state diagram unit 30, a reference load profile unit 32, a power control rule unit 34, and a power control constraint unit 36.

As shown in FIG. 4, the operational state determining unit 12 is adapted to determine operational state information with respect to at least one service provided by a service unit 24, further to determine operational state information with respect at least one software executed in a software unit 26, and still further to determine operational state information with respect at least one hardware unit 28 of the network node 10. Preferably, operational state information may be determined according to a pre-determined timing.

Figure 5:
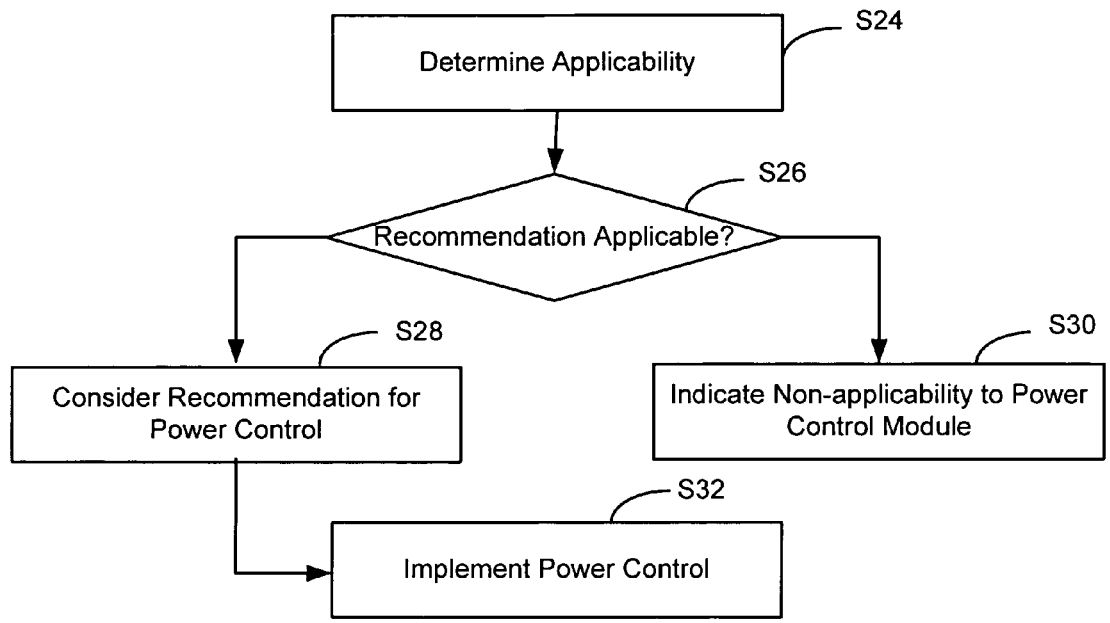
FIG. 5 shows a further detailed flowchart of operation for the power control unit comprises in the network node shown in FIG. 1.

As shown in FIG. 5, operational state information determined by the operational state determining unit 12 may then be exchanged either with the power control unit 14 for local processing within the network node or with the communication unit 16 for subsequent forwarding to the power control module 18.

FIG. 5 shows a further detailed flowchart of operation for the power control unit 14 in the network node 10 shown in FIG. 1.

As shown in FIG. 5, a step S24, operatively executed by the power control module 14, serves to determine applicability of the power control recommendation in view of the current operative state of the network node 10. Here, applicability of the power control recommendation is determined through consideration of a current operative state of the network node. Optionally, also pre-determined power control rules and/or constraints for optimization of the power consumption of the network node may be considered.

As shown in FIG. 5, a step S26, operatively executed by the power control module 14, serves to interrogate applicability of the power control recommendation. In the affirmative case, there follows a step S28, operatively executed by the power control module 14, so as to consider the power control recommendation during power control of the network node. In the negative case, there follows a step S30, executed by the communication unit 16 of the network node, to forward a non-applicability indication with respect to the power control recommendation to the power control module 18.

As shown in FIG. 5, following step S28 there follows a step S32, operatively executed by the power control module 14, to implement power control in the network node 10. A power control recommendation that is indicated to be not applicable according to step S30 is not implemented.

Figure 6:
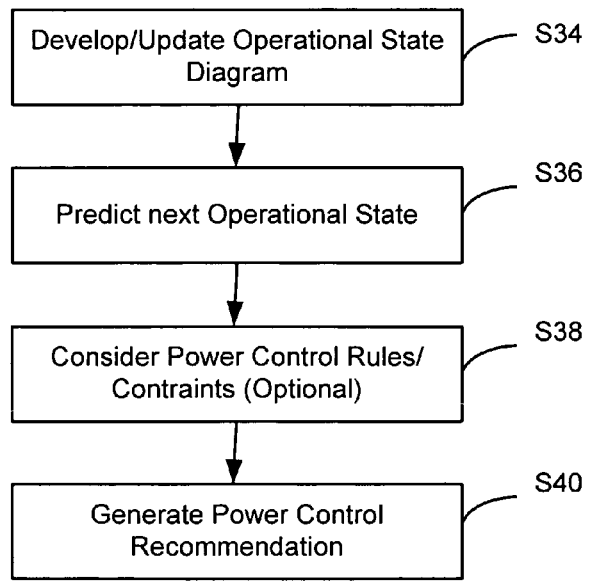
FIG. 6 shows a flowchart of operation for the operational state diagram unit comprised in the power control module shown in FIG. 4.

FIG. 6 shows a flowchart of operation for the operational state diagram unit 30 comprised in the power control module 18 shown in FIG. 4.

As shown in FIG. 6, a step S34, operatively executed by the operational state diagram unit 30, serves to develop and/or update an operational state diagram using operation state information received over time from the network node 10. In other words, there is developed an operational state diagram reflecting operational states of the network node and transitions between the operational states. In should be mentioned that this step S34 needs not be executed with respect to each generation of a power control recommendation but may be executed according to, e.g., pre-determined periods of time or pre-determined point in time.

As shown in FIG. 6, a step S36, operatively executed by the operational state diagram unit 30, serves to predict a next operational state on the basis of the operational state diagram and a current received operational state information.

As shown in FIG. 6, a step S38, operatively executed by the operational state diagram unit 30, serves to optionally consider power control rules maintained in the power control rule unit 34 and/or power control constraints maintained in the power control constraint unit 36.

As shown in FIG. 6, a step S40, operatively executed by the power control optimization unit 20, serves to generate the power control recommendation on the basis of the outcome of the steps S34 to S38.

Here, the power control recommendation is a full power control recommendation covering a full set of parameters being related to the controlling of the power consumption of the network node 10 or a partial power control recommendation covering a subset of parameters being related to the controlling of the power consumption of the network node 10.

Figure 7:
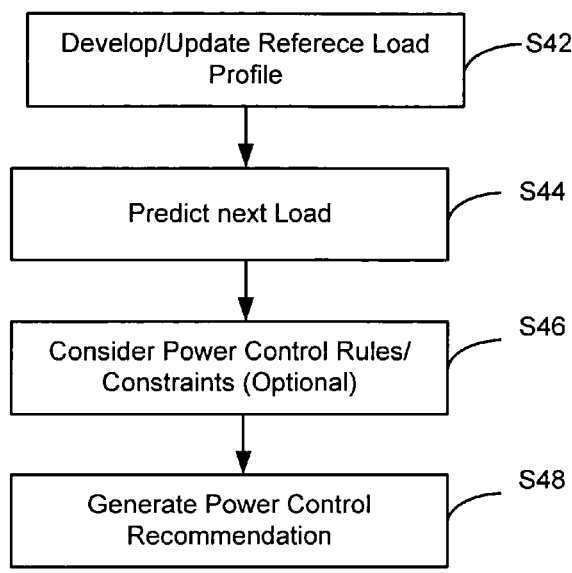
FIG. 7 shows a flowchart of operation for the reference load profile unit comprised in the power control module shown in FIG. 4.

FIG. 7 shows a further detailed flowchart of operation for the reference load profile unit comprised in the power control module 18 shown in FIG. 4.

As shown in FIG. 7, a step S42, operatively executed by the reference load profile unit 32, serves to develop/update a reference load profile in view of operational state information received from the network node over time. In should be mentioned that this step S42 needs not be executed with respect to each generation of a power control recommendation but may be executed according to, e.g., pre-determined periods of time or pre-determined point in time.

As shown in FIG. 7, a step S44, operatively executed by the reference load profile unit 32, serves to predict a next operational load on the basis of the reference load profile and a current received operational state information.

As shown in FIG. 7, a step S46, operatively executed by the reference load profile unit 32, serves to optionally consider power control rules maintained in the power control rule unit 34 and/or power control constraints maintained in the power control constraint unit 36.

As shown in FIG. 7, a step S48, operatively executed by the reference load profile unit 32, serves to generate the power control recommendation on the basis of the outcome of the steps S34 to S38.

Figure 8:
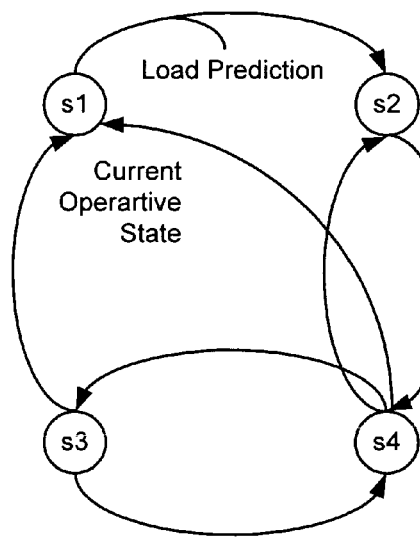
FIG. 8 shows an example of an operational state diagram as used within the power control module.

FIG. 8 shows an example of an operation state diagram as used within the power control module.

As shown in FIG. 8, the operational state diagram reflects different operational states, e.g., s1 to s4, of the network node and transitions there between. It should be noted that the operational state and related transitions may dynamically change over time, e.g., due to a modified hardware or software configuration of the network node 10.

As also shown in FIG. 8, there may be multiple transitions into a state or out of a state. In the latter case it could be appropriate to consider all possibilities for states following a current state and to generate a power control recommendation covering all such upcoming operational sates.

Figure 9:
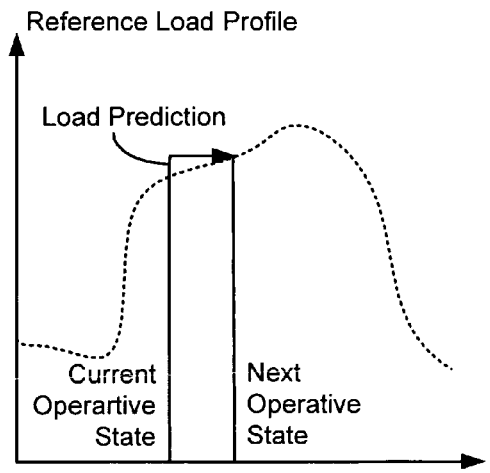
FIG. 9 shows an example of a reference load profile as used within the power control module.

FIG. 9 shows an example of a reference load profile as used within the power control module.

As shown in FIG. 9, the reference load profile may be used to predict a future operational load of the network node 10 and for generation of a power control recommendation covering such a future operational load. E.g., the reference load profile unit 32 may monitor the traffic load of the network node 10 for a predefined period of time to develop a reference load profile. Based on the reference load profile, the power control optimization unit 20 predicts the required capacity and creates an on/off profile for the network node 10. This on/off profile can be corrected by a defined factor to secure sufficient capacity up to a certain relative overload. Following this on/off profile, the power control unit 14 of the network node 10 then shuts down or (re-)starts components in the service unit 24, the software unit 26, and/or the hardware unit 28 as described by the reference load profile.

Further, the monitoring behaviour of the reference load profile may be defined according to multiple instantiations to address seasonal variations like, for example, Christmas, New Year's Eve or Mother's Day events, which cannot be considered by a single reference load profile.

Reference load profiles can be used for the whole network node 10, for its individual hardware components, for its individual services, and/or for its individual software programs executed in the network node 10.

In more detail, the reference load profile unit 32 may execute a learning phase according to step S42 shown in FIG. 7. During the learning phase, the reference load profile unit 32 gathers information about the load situation in each power controllable entity in the network node 10. E.g., the load information is collected for defined intervals and the peak values are registered per entity.

Further, during the learning phase the reference load profile unit 32 may collect the peak load values from all entities and summarize the peak load values, e.g., per functional group, e.g., speech codec, conference call device.

Still further, according to the present invention a defined overload factor may be applied, with the result being the needed capacity per service, software or hardware component subject to optimized power control. This required capacity per service, software or hardware component may be divided by the maximum possible capacity of a single entity of this service, software or hardware component, and thereby yielding the number of required entities to be available during a particular time period.

Still further, during an execution phase the power control optimization unit 20 may take the number of required entities and inform the power control unit 14 in the network node 10 about an upcoming change in entity configuration after a pre-warning time has elapsed. This is advantageous in that the power control unit 14 in the network node 10 may assure that the entities scheduled for power down are no longer used as preferred entities for allocation in the case that entities, e.g., shall be taken out of service. The actual pre-warning time may be user configurable per service, software or hardware component.

Still further, before service, software or hardware components are finally taken out of service, the power control optimization unit 20 of the power control module 18 will verify with the power control unit 14 of the network node 10 that the entities which are planned for power down are in fact no longer used, see step S24 shown in FIG. 5. If this is the case, the power control unit 14 of the network node 10 powers down the entities scheduled for power down.

Still further, re-instantiation of dormant entities shall be achieved, e.g., by simply re-applying power—or cranking up the operating frequency of hardware components. Preferably, the power control unit 14 of the network node 10 is informed about the availability of the respective entities. It is optional to measure the time from this wake-up call to full performance as an optimization of the wake up time.

Figure 10:
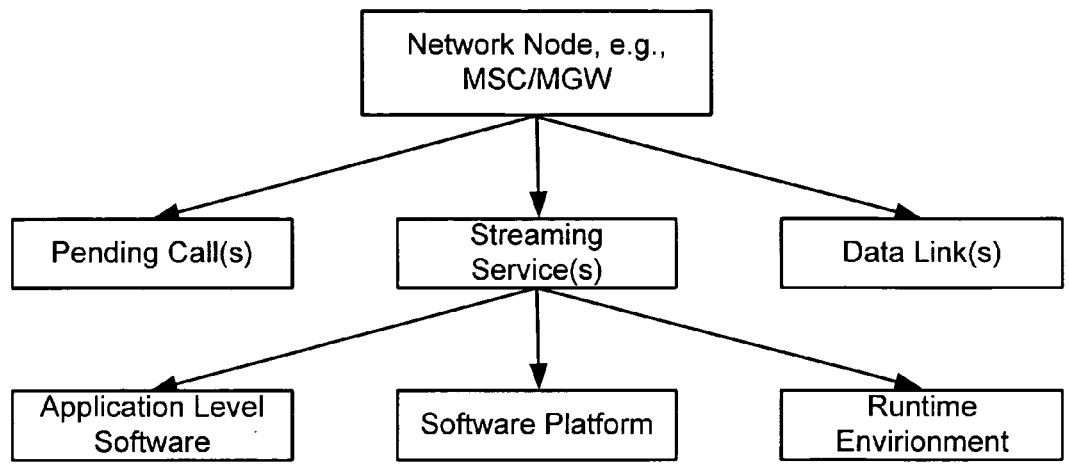
FIG. 10 shows a hierarchy for structuring the operation of services and software in the network node.

FIG. 10 shows a hierarchy for structuring the operation of services and software in the network node.

As shown in FIG. 10, the view on services and/or software running in the network node may be, in a non-binding manner for the scope of the present invention, structured in a hierarchical manner. Typical examples for services are ongoing call traffic, data traffic or data links. Also, there is no restriction with respect to type of software module, which may form part of, e.g., either one if an application layer, a platform layer and/or the runtime environment of the network node.

Figure 11:
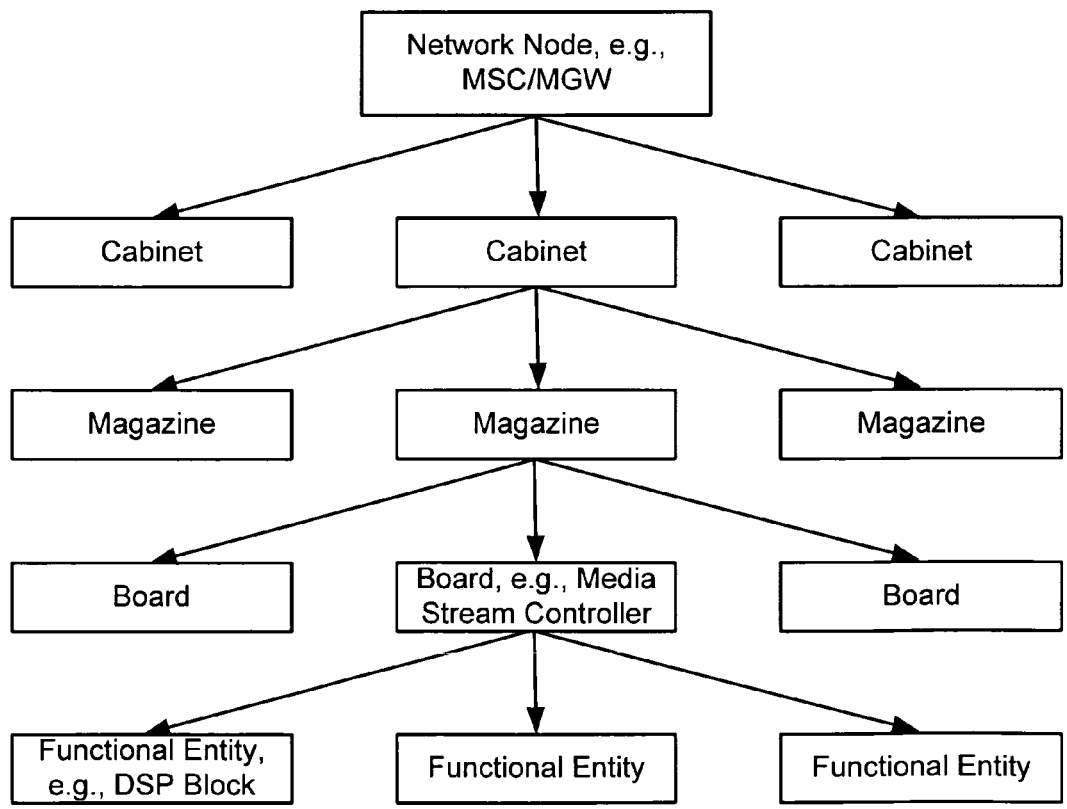
FIG. 11 shows a hierarchy of hardware components in the network node.

FIG. 11 shows a blade cluster reflecting a hierarchy of hardware components in the network node.

As shown in FIG. 11, solutions for the implementation of the network node 10 rely on a hierarchy of hardware components. The network node 10, divides from a hardware perspective into at least one cabinet. Each cabinet itself is constructed from at least one magazine, each magazine again is constructed using at least one board, and each board is constructed using at least one functional hardware entity, e.g., a DSP block.

Here, a cabinet is a housing unit which can house multiple magazines with a common power and signal distribution, containing one or more functionally identical or functionally different magazines.

Further, a magazine is a housing unit which can house multiple boards (as defined above) with a common power and signal distribution, containing one or more functionally identical or functionally different boards.

Still further, a board is an electronic circuit contained on a single PCB, or group of PCBs, with a single power inlet (piggy back construction), containing one or more functionally identical functional entities.

Still further, a functional entity is a group of electronic components which perform a well defined task and of which there are multiple installed in the system to perform the defined task in parallel, independent from each other. An entity is as such only functional in view of this task if all components in this entity are functional. A single functional entity can be powered down without impacting the overall function of the system due to the multiplicity.

For each of the different components of the hardware setup as described above a typical power control recommendation would be power down referring to a state of no power consumption or extremely low power consumption (typically less than 1% of the power up energy consumption).

In more detail, a partial power down can be applied to hardware which implements a redundant function through multiple, functionally identical entities. E.g., pools of Digital Signal Processors—used, for example, in media gateways MGWs—can be segmented and individual segments of this matrix can then be completely switched off.

Further, a full power down can be applied to complete functional entities contained on a single board, in a single magazine and/or a complete cabinet.

Still further, power reduction can be achieved through controlled reduction of operating frequencies of the involved electronic circuits, mainly microprocessors of all sorts, including general purpose CPUs and Digital Signal Processors. The reduction of operating frequency is implemented by means of voltage controlled oscillators or by feeding the normal clock (Clock with frequency of x G(M/K)Hz) signal into a divider chain which allows the usage of Clock, Clock/2, Clock/4, Clock/8, etc., by selecting through a logical (hardware) NAND operation. The method which best suits the need is application dependent and can be chosen accordingly.

In a preferred embodiment of the present invention is applied to a blade cluster architecture of a network node.

The invention claimed is:

1. A method of operating a power control module for optimizing power consumption of a network node operated in a communication system, the method comprising:
receiving operational state information from the network node;
generating a power control recommendation through evaluation of operational state information of the network node as a proposal for the power control configuration of the network node, to optimize power consumption thereof; and
forwarding the power control recommendation to the network node;
receiving a non-applicability indication from the network node upon non-applicability of the power control recommendation;
wherein the power control recommendation is a full power control recommendation covering a full set of parameters being related to the controlling of the power consumption of the network node, or a partial power control recommendation covering a subset of parameters being related to the controlling of the power consumption of the network node.

2. The method of claim 1, wherein the operational state information is selected from a group comprising state information with respect to at least one service provided by the network node, at least one software executed in the network node, and at least one hardware unit of the network node.

3. The method of claim 1, wherein the method includes developing an operational state diagram reflecting operational states of the network node and transitions between the operational states, and using received operational state information for prediction of a future operational state on the basis of the operational state diagram, for generation of the power control recommendation.

4. The method of claim 1, wherein the method includes using reference load profile data according to the operational state information of the network node, for prediction of a future operational load and for generation of the power control recommendation.

5. A method of controlling power consumption of a network node operated in a communication system, the method comprising:
determining operational state information according to the operational state of the network node;
forwarding the operational state information from the network node to a power control module for generation of a power control recommendation;
receiving the power control recommendation from the power control module as a proposal for the power control configuration of the network node, to optimize power consumption thereof;
determining applicability of the power control recommendation in view of a current operative state of the network node;
executing power control for the network node in consideration of the power control recommendation;
wherein the power control recommendation is a full power control recommendation covering a full set of parameters being related to the controlling of the power consumption of the network node, or a partial power control recommendation covering a subset of parameters being related to the controlling of the power consumption of the network node.

6. The method of claim 5, wherein the method includes interrogating operational states with a pre-determined timing and with respect to at least one service provided by the network node, at least one software executed in the network node, or at least one hardware unit of the network node, for determination of the operational state information.

7. The method of claim 5, wherein the determining applicability of the power control recommendation is executed through consideration of a set of pre-determined power control rules, or a set of pre-determined power control constraints for the network node, or both.

8. The method of claim 5, wherein the method includes implementing the power control recommendation upon applicability thereof.

9. The method of claim 5, wherein the method includes forwarding a non-applicability indication to the power control module upon non-applicability of the power control recommendation.

10. A power control module for optimizing power consumption of a network node operated in a communication system, the power control module comprising:
one or more hardware circuits configured to:
receive operational state information from the network node;
generate a power control recommendation through evaluation of operational state information of the network node as a proposal for the power control configuration of the network node, to optimize power consumption thereof; and
forward the power control recommendation to the network node;
receive a non-applicability indication from the network node upon non-applicability of the power control recommendation:
wherein the one or more hardware circuits are configured to generate the power control recommendation as a full power control recommendation covering a full set of parameters being related to the controlling of the power consumption of the network node or as a partial power control recommendation covering a subset of parameters being related to the controlling of the power consumption of the network node.

11. The power control module of claim 10, wherein the one or more hardware circuits are configured to evaluate operational state information selected from a group comprising state information with respect to at least one service provided by the network node, at least one software executed in the network node, and at least one hardware unit of the network node.

12. The power control module of claim 10, wherein the one or more hardware circuits are further configured to develop an operational state diagram reflecting operational states of the network node and transitions between the operational states, and to use received operational state information for prediction of a future operational state of the network node, on the basis of the operational state diagram, for generation of the power control recommendation.

13. The power control module of claim 10, wherein the one or more hardware circuits are further configured to use reference load profile data according to the operational state of the network node, for prediction of a future operational load and for generation of the power control recommendation.

14. A network node operated in a communication system, the network node comprising:
one or more hardware circuits configured to:
determine operational state information according to the operational state of the network node;
forward the operational state information from the network node to a power control module for generation of a power control recommendation; and
receive the power control recommendation from the power control module as a proposal for the power control configuration of the network node to optimize power consumption thereof;
determine applicability of the power control recommendation in view of the current operative state of the network node;
execute power control for the network node in consideration of the power control recommendation;
wherein the power control unit is adapted to execute power control for the network node in consideration of a full power control recommendation covering a full set of parameters being related to the controlling of the power consumption of the network node, or a partial power control recommendation covering a subset of parameters being related to the controlling of the power consumption of the network node.

15. The network node of claim 14, wherein the one or more hardware circuits are configured to interrogate operational states with a pre-determined timing and with respect to at least one service provided by the network node, at least one software executed in the network node, or at least one hardware unit of the network node, for determination of the operational state information.

16. The network node of claim 14, wherein the one or more hardware circuits are configured to determine applicability of the power control recommendation through consideration of a set of pre-determined power control rules, or a set of pre-determined power control constraints for the network node, or both.

17. The network node of claim 14, wherein the one or more hardware circuits are configured to implement the power control recommendation upon applicability thereof.

18. The network node of claim 14, wherein the one or more hardware circuits are configured to initiate a non-applicability indication to the power control module upon non-applicability of the power control recommendation.

* * * * *